United States Patent [19]

Wilson

[11] 4,285,238
[45] Aug. 25, 1981

[54] DEVICE FOR MEASURING LUBRICATING OIL TEMPERATURE SUPPLIED TO AN INTERNAL COMBUSTION MOTORCYCLE ENGINE

[76] Inventor: Thomas E. Wilson, 12889 E. Eleven Mile Rd., Warren, Mich. 48093

[21] Appl. No.: 899,803

[22] Filed: Apr. 25, 1978

[51] Int. Cl.³ .................. G01K 1/14; G01K 13/02
[52] U.S. Cl. .................................. 73/346; 73/349
[58] Field of Search .................. 73/349, 346, 343 B, 73/292, 347, 348; 184/1 C, 6.4; 340/57, 59; 33/126.7; 180/33 R

[56] References Cited

U.S. PATENT DOCUMENTS

| | | | |
|---|---|---|---|
| 1,102,062 | 6/1914 | Liedtke | 73/349 |
| 1,399,534 | 12/1921 | Witham | 73/349 |
| 1,781,512 | 11/1930 | Holt | 73/346 |
| 3,274,691 | 9/1966 | Bolles | 73/292 |
| 3,626,596 | 12/1971 | Manke | 33/126.7 |
| 3,845,661 | 11/1974 | Hollweck et al. | 73/349 |
| 4,154,105 | 5/1979 | Mackley | 73/346 |

FOREIGN PATENT DOCUMENTS 352218 7/1931 United Kingdom .................. 180/33 R

OTHER PUBLICATIONS

Empi Dealer Catalog, a publication of Engineered Motor Products, Riverside CA 92502, p. N3.

*Primary Examiner*—S. Clement Swisher
*Attorney, Agent, or Firm*—Remy J. VanOphem

[57] ABSTRACT

A device for measuring engine lubricating oil temperature circulating through the oil lubricating system of an internal combustion engine of a motorcycle. Another advantageous embodiment consists of a stem-type thermometer attached to the wall of the oil reservoir with the temperature sensing stem projecting through an appropriate aperture in the oil reservoir wall. In situations wherein the oil reservoir is connected to the internal combustion engine of the motorcycle by an oil carrying conduit, yet another advantageous embodiment can be employed which consists of a branch conduit projecting from the oil carrying conduit with the temperature sensing stem of the thermometer extending axially into the branch conduit. A further advantageous embodiment consists of a stem-type thermometer having markings along the temperature sensing stem corresponding to various oil levels. The thermometer is mounted to the oil filler cap of the oil reservoir such that when the oil filler cap is in place closing the oil filler port of the oil reservoir, the temperature sensing stem projects into the interior of the oil reservoir.

5 Claims, 8 Drawing Figures

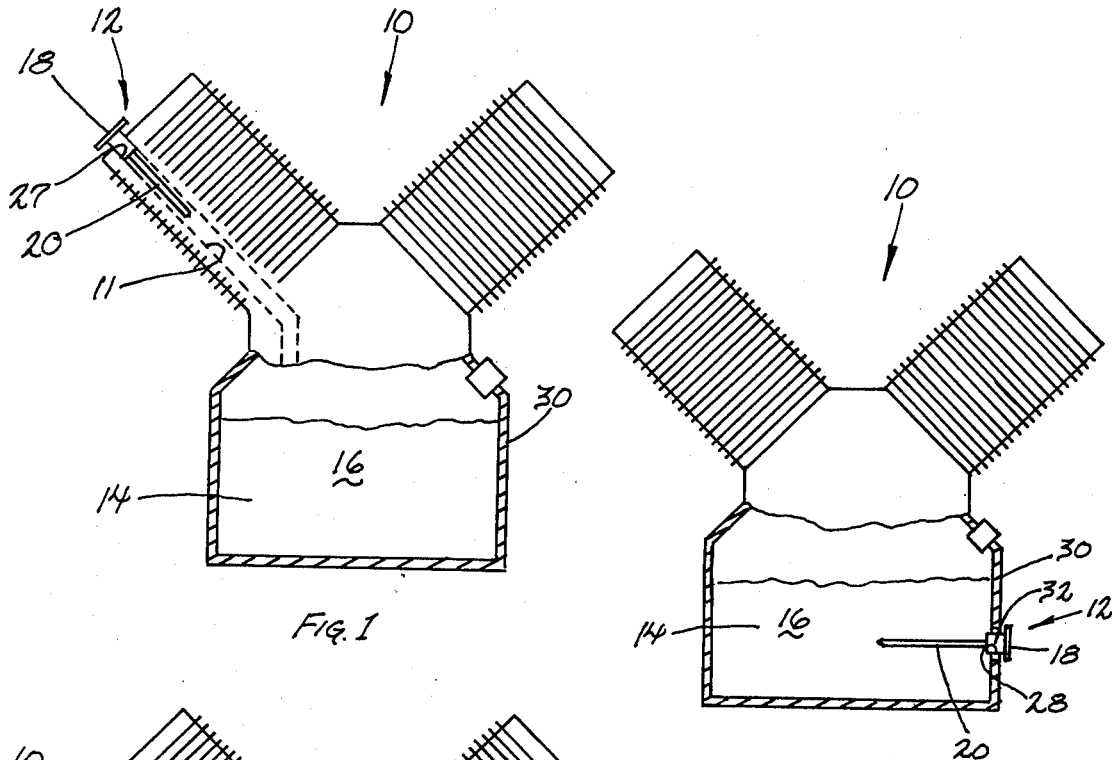
Fig. 1
Fig. 2
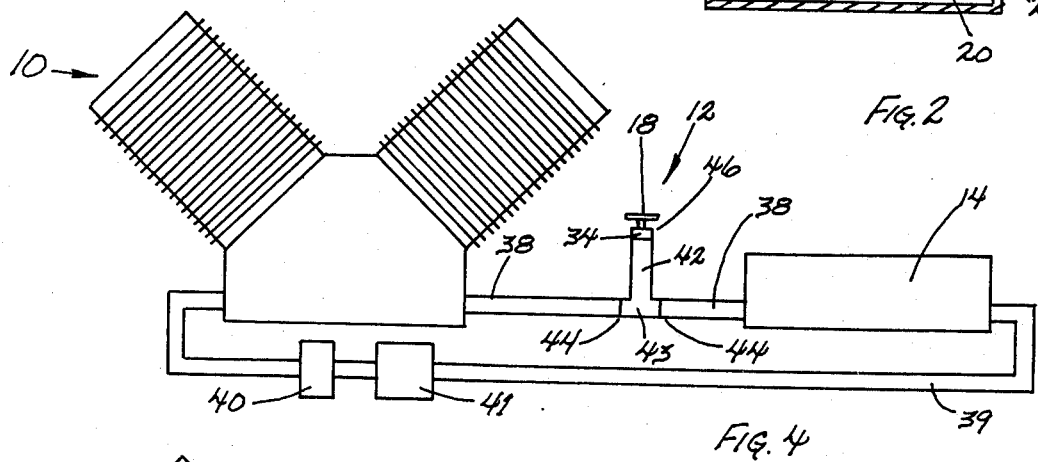
Fig. 4
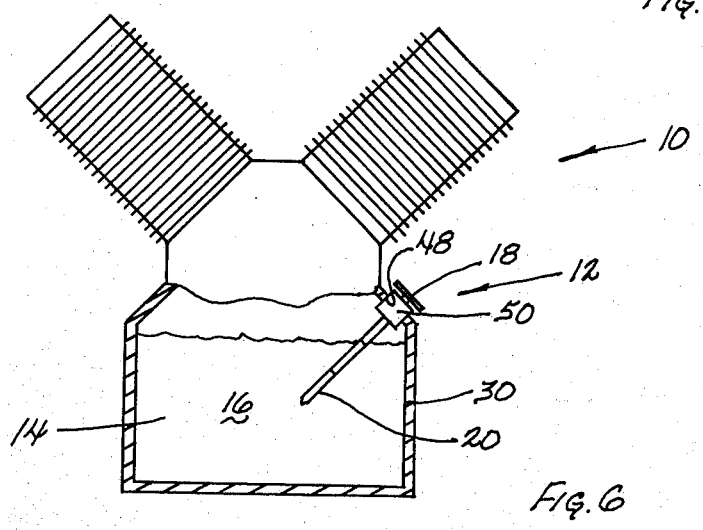
Fig. 6

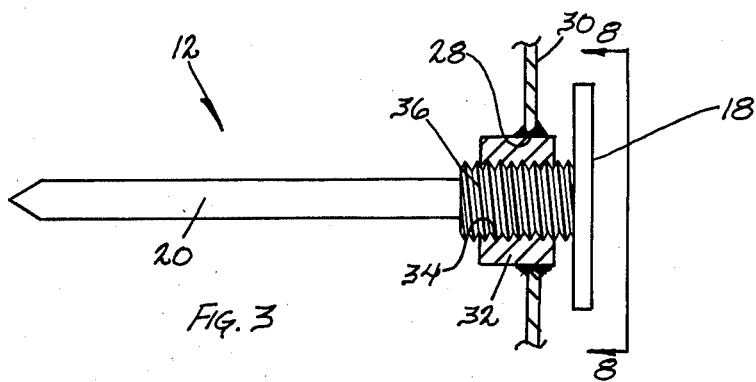
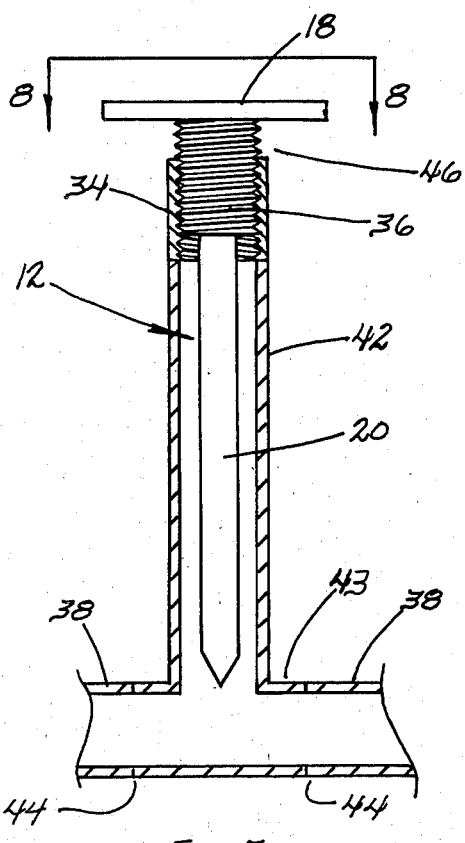
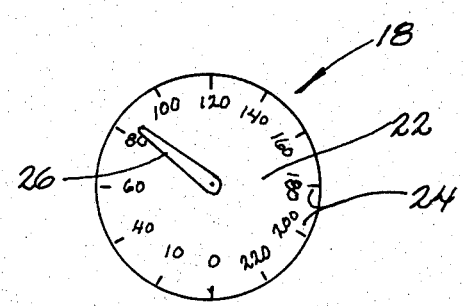
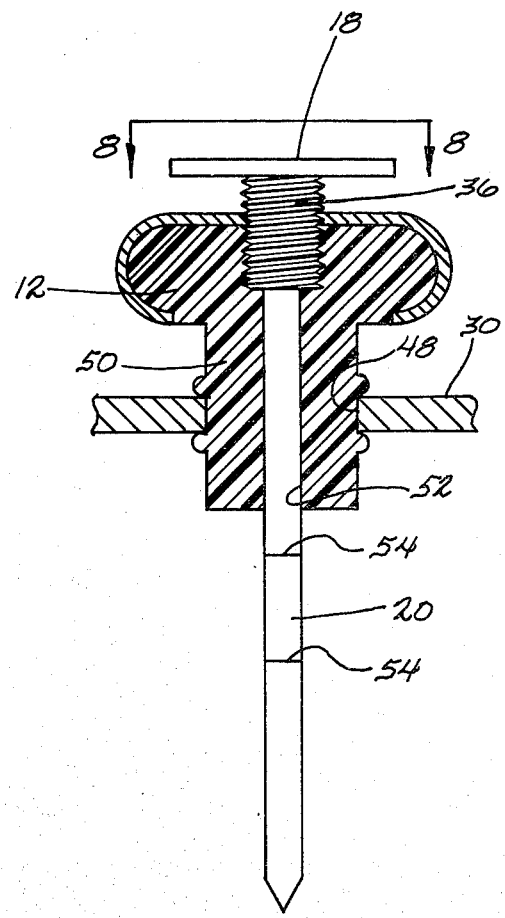

DEVICE FOR MEASURING LUBRICATING OIL TEMPERATURE SUPPLIED TO AN INTERNAL COMBUSTION MOTORCYCLE ENGINE

BACKGROUND OF THE INVENTION

The present invention relates to thermometers, and more particularly to a thermometer for measuring the oil temperature being supplied to an internal combustion engine especially those used to power motorcycles.

The temperature of the lubricating oil supplied to an internal combustion engine is critical to the performance and life of the engine. In motorcycle applications, because they are recreational vehicles and therefore often driven fast over rough terrain and under heavy loads, the engine lubricating oil temperature can rise above 200° F. It is believed that every 20° F. increase in engine oil lubricating temperature reduces the lubricating quality of the oil by 50%. In addition, of course, the higher the temperature of the lubricating oil, the less is its ability to aid in cooling the engine because of improper lubricating temperature. Therefore, there is a special need in motorcycle applications for an oil temperature measuring device. However, in motorcycle applications, particularly for motorcycles used for off-the-road riding, this need is complicated somewhat by the fact that the oil temperature measuring device must be sturdy to withstand the rigors of vibration and impact as will occur when the motorcycle is driven over rough terrain or in a race.

Temperature sensing devices for measuring the temperature of oil being supplied to an internal combustion engine are known, for example, as disclosed in U.S. Pat. No. 1,678,389 issued on July 24, 1928 to A. Holmes.

However, none of the oil temperature measuring devices known to me satisfies the above-mentioned requirements for motorcycle applications.

SUMMARY OF THE INVENTION

It is an object of the present invention to provide a lubricating oil temperature measuring device to measure the temperature of lubricating oil being supplied to the internal combustion engine of a motorcycle.

It is another object of the present invention to provide such a temperature measuring device which is sturdy enough to withstand the rigors of vibration and impact.

It is a further object of the present invention to provide such a temperature measuring device which is straightforward and, therefore, relatively inexpensive to manufacture and maintain.

More particularly, the present invention, in one advantageous embodiment, consists of a stem-type thermometer attached to the engine with the temperature sensing stem projecting through an appropriate aperture into the oil flow passage of the lubricating system.

The present invention, in another advantageous embodiment, provides a device to accurately measure lubricating oil temperature in an oil reservoir for an internal combustion engine of a motorcycle which comprises a stem-type thermometer attached to the wall of the oil reservoir with the temperature sensing stem of the thermometer projecting through an appropriate aperture in the wall of the reservoir and the temperature indicating head of the thermometer disposed to the exterior side of the oil reservoir.

In yet another advantageous embodiment, which is particularly well suited for applications wherein the oil reservoir is connected to the internal combustion engine of a motorcycle by means of an oil carrying conduit, the present invention comprises a branch conduit projecting from and in fluid communication with the oil carrying conduit and having an open distal end, and a stem-type thermometer attached to the open distal end of the branch conduit with its temperature sensing stem extending a predetermined distance into and coaxial with the branch conduit.

Yet a further advantageous embodiment of the present invention provides a device to measure the lubricating oil temperature and the amount of lubricating oil in an oil reservoir for an internal combustion engine of a motorcycle which comprises an oil reservoir cap for removably closing the oil filler port in the wall of the oil reservoir, a stem-type thermometer attached to the oil reservoir cap is in position closing the oil filler port in the wall of the oil reservoir, the temperature indicator dial of the thermometer is located outside of the oil reservoir and the temperature sensing stem projects into the interior of the oil reservoir. A scale is associated with the temperature sensing stem of the thermometer for measuring the amount of lubricating oil in the oil reservoir.

BRIEF DESCRIPTION OF THE DRAWINGS

A better understanding of the invention will be achieved upon reference to the accompanying specification and by reference to the drawings wherein like numerals refer to like parts throughout the several views and in which:

FIG. 1 is a partially sectioned schematic representation of an internal combustion engine for a motorcycle having one advantageous embodiment of the present invention;

FIG. 2 is a partially sectioned schematic representation of an internal combustion engine for a motorcycle having another advantageous embodiment of the present invention;

FIG. 3 is an enlarged cross-sectional view of a portion of FIG. 1;

FIG. 4 is a partially sectioned schematic representation of an internal combustion engine for a motorcycle having yet another advantageous embodiment of the present invention;

FIG. 5 is an enlarged cross-sectional view of a portion of FIG. 4;

FIG. 6 is a partially sectioned schematic representation of an internal combustion engine for a motorcycle having a further advantageous embodiment of the present invention;

FIG. 7 is an enlarged cross-sectional view of a portion of FIG. 6; and,

FIG. 8 is a view of a component of the present invention taken in the direction of arrows 8—8 in FIGS. 3, 5 and 7.

DETAILED DESCRIPTION

With reference to FIG. 1, there is shown a schematic representation of an internal combustion engine 10 for a motorcycle which has an oil lubricating system represented, for simplicity's sake, by the oil flow passage 11, it being understood that the oil lubricating system may have many such passages throughout the engine to carry oil to the various engine parts requiring lubrication.

The stem-type thermometer 12 comprises temperature indicating means 18 and a temperature sensing stem 20 extending from the temperature indicating means 18. The temperature indicating means 18 is illustrated in FIG. 8 as a dial 22 having a plurality of numerals 24 in spaced circular array and a pointer 26 pivotally mounted thereto for indicating the numeral 24 corresponding to the temperature of the oil sensed by the temperature sensing stem 20. The internal structure of the thermometer 12 can be of any conventional internal structural design and does not constitute a part of the present invention. Therefore, the internal structure of the thermometer 12 will not be discussed here.

An appropriate aperture 27 is made in the engine 10 at any convenient location to communicate with the oil flow passage 11 of the lubricating system. The thermometer 12 is attached to the engine with the temperature sensing stem 20 projecting through the aperture 27 into the oil flow passage 11 of the lubricating system so that it is in at least partially submerged relationship with the oil flowing through the oil flow passage 11 of the lubricating system, and with the temperature indicator means disposed to the exterior of the engine 10.

With reference to FIG. 2, there is shown a schematic representation of an internal combustion engine 10 for a motorcycle having a stem-type thermometer 12 of conventional construction mounted in the oil reservoir or engine crankcase 14 of the engine 10 for measuring the temperature of the lubricating oil 16 in the oil reservoir 14.

With reference to FIGS. 2 and 3, an aperture 28 is made in the wall 30 of the oil reservoir 14. The thermometer 12 is attached to the wall 30 with the temperature sensing stem 20 projecting through the aperture 28 into the interior of the oil reservoir 14 so that it is in at least partially submerged relationship with the oil 16 in the reservoir 14 and the temperature indicator means 18 is disposed to the exterior of the reservoir 14. The thermometer 12 may be attached to the reservoir wall 30 by virtually any conventional or otherwise convenient means. For example, a coupling or fitting 32 having an internally threaded bore 34 can be affixed to the reservoir wall 30 at the aperture 28 as by for example, welding or brazing, and the thermometer 12 can be fabricated with an externally threaded boss 36 which threadably mates with the threaded bore 34 of the coupling 32.

Now, with reference to FIGS. 4 and 5, there is shown another advantageous embodiment of the present invention which is particularly useful in applications wherein the oil reservoir 14 supplies lubricating oil to the internal combustion engine 10 of the motorcycle through an oil carrying conduit 38. After the oil circulates through the engine 10, it is returned to the reservoir 14 through an oil return conduit 39. An oil filter 40 and an oil cooler 41 may be disposed in the oil return conduit to filter particulate matter from the return oil and to cool it, respectively. A branch conduit 42 is illustrated as being, for example, in fluid oil communication with and projecting from the oil carrying conduit 38 between the oil reservoir 14 and engine 10. This branch conduit 42 is connected at one of its ends 43 to the oil carrying conduit 38 by virtually any conventional or otherwise convenient means such as, for example, brazing as shown at the numeral 44. The other or distal end 46 of branch conduit 42 is open. The thermometer 12 is attached to the branch conduit 42 at the open distal end 46 with its temperature sensing stem 20 projecting a predetermined axial distance into the branch conduit 42 and with the temperature indicating means 18 disposed outside the branch conduit 42 at the distal end 46. Preferably, the temperature sensing stem 20 should not interfere with the flow of oil in the oil carrying conduit 38 and should, therefore, not project into the oil carrying conduit 38, but should terminate proximate the intersection of the branch conduit 42 and oil carrying conduit 38. It should be clearly understood that the branch conduit 42 could be as well disposed anywhere in the return oil conduit 39, such as, between the engine 10 and oil filter 40, or between the oil filter 40 and oil cooler 41, or between the oil cooler 41 and oil reservoir 14. In addition, in those motorcycles incorporating a separate oil vent conduit between the engine and oil reservoir, the branch conduit 42 could be just as readily attached to this oil vent conduit.

The connection of the thermometer 12 to the distal end 46 of the branch conduit 42 can be made by any conventional or otherwise convenient means. For example, the thermometer 12 can be fabricated with a threaded boss 36 which mates with a threaded coupling or compression fitting 34 connected at the distal end 46 of the branch conduit 42.

With reference to FIGS. 6 and 7, there is shown a further advantageous embodiment of the present invention which utilizes the oil filler port 48 of the oil reservoir 14 of the internal combustion motorcycle engine 10. The thermometer 12 is attached to the oil filler port cap 50 which is used to removably close the oil filler port 48. The oil filler port cap 50 is formed with one aperture 52 therethrough. The thermometer 12 is attached to the oil filler port cap 50 by inserting the temperature sensing stem 20 through the aperture 52 such that the temperature indicating means 18 is disposed to one side of the cap 50 and the temperature sensing stem 20 projects from the opposite side of the cap 50. Thus, when the cap 50 is in position closing the oil filler port 48, the temperature sensing stem 20 projects into the interior of the oil reservoir 14 in at least partially submerged relationship with the oil 16 in the reservoir 14 and with the temperature indicator means 18 located outside of the oil reservoir 14. Furhermore, the temperature sensing stem 20 has indicia associated with it such as, for example, graduated marks 54 for indicating various predetermined amounts of oil in the reservoir 14. Thus, when it is desired to determine the amount of lubricating oil in the reservoir 14, the cap 50 is removed and that portion of the temperature sensing stem 20 wetted by the oil is compared to the graduated marks 54.

The means by which the thermometer 12 will be attached to the oil filler port cap 50 will vary depending upon the structure of the cap itself and may be any conventional or convenient means. For example, if the cap 50 is fabricated of rubber, the aperture 52 through the cap 50 may be slightly smaller in transverse crosssection than the cross-sectional size of the temperature sensing stem 20 in which case the rubber material of the cap 50 surrounding the aperture 52 will tightly grip the temperature sensing stem 20. In other cases wherein the oil filler port cap 50 is fabricated of a rigid material such as metal, or partially of metal, the thermometer 12 may be fabricated with the externally threaded boss 36 which threadably engages an appropriately threaded aperture in the cap 50.

The present invention thus provides a device for measuring oil temperature, and for both measuring oil temperature and the amount of oil in the oil reservoir of an internal combustion motorcycle engine which is straightforward, sturdy, not within the head impact zone of the driver or in a position which may otherwise interfere with his vision or operation of the motorcycle but which is still conveniently located for determining the oil temperature and amount of oil in the reservoir and which is relatively inexpensive.

The foregoing detailed description is given primarily for clarity of understanding and no unnecessary limitations should be understood therefrom, for modifications will be apparent to one skilled in the art without departing from the scope or spirit of the invention as defined in the appended claims.

What is claimed is:

1. A device for measuring the temperature of engine lubricating oil circulating through the oil lubricating system of an internal combustion engine, said device comprising:

an appropriate aperture communicating with an oil flow lubricating passage of said oil lubricating system proximate an area of said engine requiring lubrication;

a thermometer having a closure body, said closure body mounted to said aperture, said thermometer further having temperature indicator means and a temperature sensing stem extending from said temperature indicator means with said closure body interposed said temperature indicator means and said temperature sensing stem, said temperature indicating means having a dial with indicia corresponding to various temperatures at one end and an opposite end mounted contiguous to said closure body and perpendicular to said temperature sensing stem, said closure body having a sealing surface configured to cooperate with said aperture for isolating the engine lubricating oil from particulate contaminants originating from sources external to said passage, said thermometer further being positioned in said aperture with said temperature indicator means disposed to the exterior of said engine such that irrespective of the angular orientation of said closure body in said aperture, said dial is readable by a viewer positioned above said engine, said thermometer being attached to said engine with said temperature sensing means projecting through said aperture and into said oil flow lubricating passage of said oil lubricating system in at least partially submerged relationship with oil flowing through the oil flow lubricating passage of said lubricating system; and means for indicating the indicia corresponding to the temperature of the oil flowing in said oil flow lubricating passage.

2. A device for measuring the temperature of engine lubricating oil in an oil reservoir for an internal combustion engine, said device comprising:

said oil reservoir having an aperture through its wall;

a thermometer having a closure body, said closure body mounted to said aperture, said thermometer further having temperature indicator means and a temperature sensing stem extending from said temperature indicator means with said closure body interposed said temperature indicator means and said temperature sensing stem, said temperature indicator means having a dial with indicia corresponding to various temperatures at one end and an opposite end mounted contiguous to said closure body and perpendicular to said temperature sensing stem, said closure body having a sealing surface configured to cooperate with said aperture for isolating the engine lubricating oil from particulate contaminants originating from sources external to the oil in said reservoir;

said thermometer further being positioned in said aperture with said temperature indicator means disposed to the exterior of said oil reservoir such that irrespective of the angular position of said closure body in said aperture, said dial is readable by a viewer positioned above said engine, said thermometer being attached to said oil reservoir with said temperature sensing stem projecting through said aperture in said oil reservoir wall and into the interior of said oil reservoir in at least partially submerged relationship with the oil in said oil reservoir; and means for indicating the indicia corresponding to the temperature of the oil in said reservoir at any given time as sensed by said temperature sensing stem.

3. A device for measuring the temperature of engine lubricating oil circulating between an oil reservoir and an internal combustion engine through an oil carrying conduit interconnecting said oil reservoir and said internal combustion engine, said device comprising:

a branch conduit projecting from and in fluid oil communication with said oil carrying conduit, said branch conduit having an open distal end;

a thermometer having a closure body, said closure body mounted to said open distal end, said closure body further terminating oil flow through said branch conduit, said thermometer further having temperature indicator means and a temperature sensing stem extending from said temperature indicator means with said closure body interposed said temperature indicator means and said temperature sensing stem, said temperature indicating means having a round dial with indicia corresponding to various temperatures at one end and an opposite end mounted contiguous to said closure body and perpendicular to said temperature sensing stem, said closure body having a sealing surface configured to cooperate with said open distal end for isolating the engine lubricating oil from particulate contamination originating from sources external to said distal end, said dial further being positioned in said open distal end such that said dial is readable by a viewer positioned above said engine, said thermometer being attached to said branch conduit at said open distal end with said temperature sensing stem projecting through said open distal end a predetermined axial distance into said branch conduit, said temperature sensing stem terminating proximate the intersection of said branch conduit and said oil carrying conduit; and means for indicating the indicia corresponding to the temperature of the oil flowing in said oil carrying conduit.

4. The device of claim 2 wherein said indicia associated with said temperature sensing stem for measuring the amount of oil within said oil reservoir, comprises at least one mark on said temperature sensing stem.

5. The device of claim 2 wherein said indicia associated with said temperature sensing stem for measuring the amount of oil within said oil reservoir comprises graduated marks spaced apart along said temperature sensing stem, each mark corresponding to a predetermined different amount of oil.

* * * * *